Sept. 29 1925.
E. G. VON GUNTEN
STRAINER DEVICE
Filed Oct. 8, 1923
1,555,493
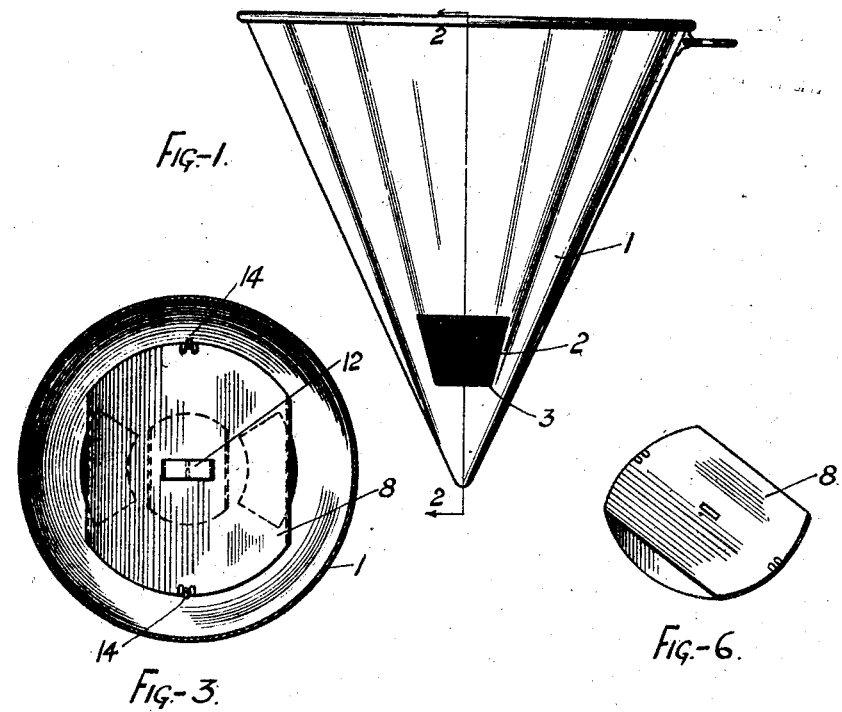
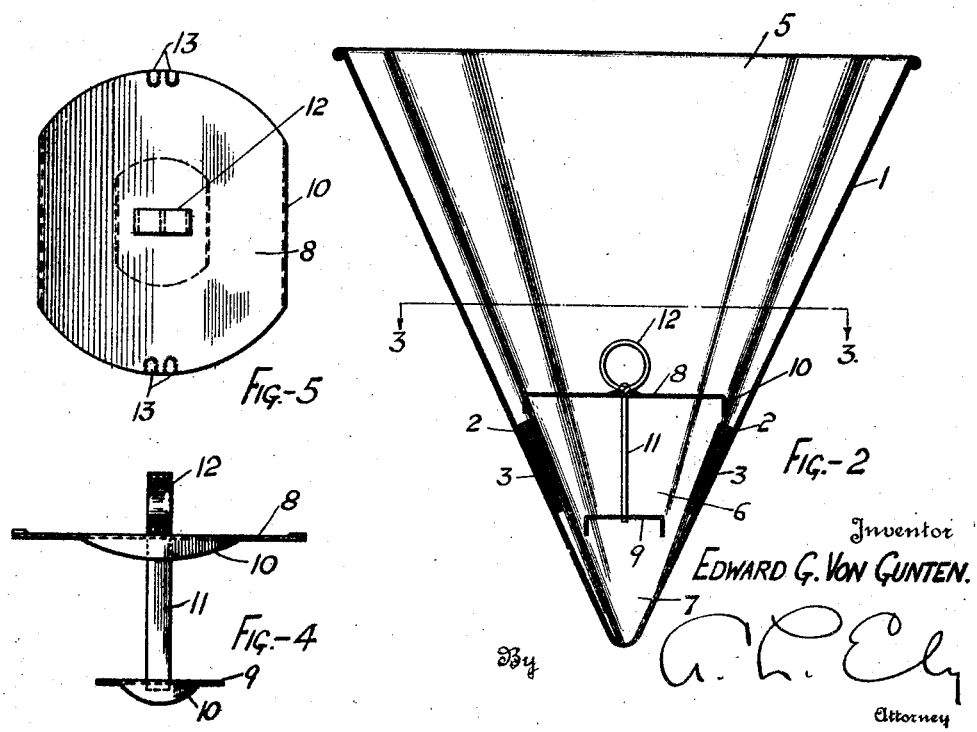
Inventor
EDWARD G. VON GUNTEN.
By
Attorney Patented Sept. 29, 1925.

1,555,493

UNITED STATES PATENT OFFICE.

EDWARD G. VON GUNTEN, OF AKRON, OHIO, ASSIGNOR TO THE FARMER'S SANITARY STRAINER & MANUFACTURING COMPANY, OF AKRON, OHIO, A CORPORATION OF OHIO.

STRAINER DEVICE.

Application filed October 8, 1923. Serial No. 667,086.

*To all whom it may concern:*

Be it known that I, EDWARD G. VON GUNTEN, a citizen of the United States, and a resident of Akron, county of Summit, State of Ohio, have invented certain new and useful Improvements in Strainer Devices, of which the following is a specification.

This invention relates to improvements in strainer devices designed particularly for use in straining milk, although it may be used in conjunction with other liquids as will presently appear.

The primary purpose of the invention is to provide a practical and inexpensive form of milk strainer which is adapted for separating the sediment from the milk as it is strained and also for entrapping the sediment in such a manner that it is not stirred up by succeeding quantities of milk to be strained. The milk is, therefore, not strained through accumulated sediment and is free from such impurities as it might thereby acquire.

One of the objects of the invention is to provide a form of milk strainer in which very fine wire mesh may be used, much finer mesh than with other forms of strainers. This invention is in the nature of an improvement in certain details upon a prior invention Serial No. 580,090, filed August 7, 1922, the specific objects of the invention being to simplify the construction and improve upon certain details shown therein.

Other objects and advantages will be apparent from the description and disclosure herein contained, it being understood that the details are non-essential and may be varied within the scope of the invention and the claims appearing hereinafter.

In the drawings:

Figure 1 is a side view of the improved milk strainer;

Figure 2 is a vertical section on the line 2—2 of Fig. 1;

Figure 3 is a cross-section on the line 3—3 of Figure 2;

Figure 4 is a side elevation of the disks or separators;

Figure 5 is a plan thereof; and

Figure 6 is a perspective view of the top plate.

The invention embodies a body portion or funnel 1 of sheet metal, which is conical as shown and closed at its lowermost portion. Upon opposite sides of the funnel and spaced from the bottom thereof are openings 2 of suitable size covered with a fine gauze or wire screen 3. These openings may be of any suitable form to provide an outlet for the milk extending in the direction of its flow over the screen.

The funnel is preferably divided into three chambers, 5, 6 and 7, the upper chamber or section 5 being the filling chamber, the intermediate section 6 being suitably designated as the filtering chamber, and the lower section 7 as the sediment trap. The openings 2 are located in the walls of the funnel at the filtering chamber.

The funnel is divided into these three chambers by an upper partition 8 and a lower partition 9. Each partition is a disk of metal adapted to fit against the walls of the funnel except at definitely located points where it is removed to allow the milk to flow into the next lower chamber. These openings or spaces are formed in any suitable way, as shown the disks are turned down along cords 10. These openings are preferably located on opposite sides of the disks and in the normal operation of the device are placed so as to be in line with the openings 2.

The two disks are preferably connected so as to be properly spaced apart and prevented from relative rotation by an operating bar or tie rod 11 which is extended above the upper disk to form a handle 12. To position the disks so that the openings 10 are in line with the openings 2, in which position the device operates at greatest efficiency, the sides of the upper disk 8 are provided with pairs of spaced lugs or knobs 13 which are adapted, as shown in Figure 3, to engage lugs 14 in the sidewalls of the funnel.

In the operation of the device, the farmer or dairyman pours the milk into the upper chamber 5 from where it flows through the openings 10 down over the inclined screens 3. By placing the strainers in an inclined position, the milk flows downwardly over them and any sediment which is separated, instead of remaining upon the screens, is washed off. It is, therefore, possible to use a very fine mesh. As the openings in the lower disk 9 are in line with the strainer, the sediment is washed down into the lower chamber or trap 7 where it is collected, the lower partition preventing the sediment from being stirred up and passed back into the filtering chamber. The upper partition directs the milk over the openings as will be appreciated.

The tie rod or handle 11 serves to hold the two disks at the proper distance apart and prevents loss of either disk. The knobs 13 assure that the disks are in proper position. Other advantages will be apparent and may be utilized in the carrying out of the invention.

What I claim is:

1. A strainer device comprising a funnel having its outer wall provided with an opening spaced from the lower end of the funnel, a screen over the opening, a removable partition extending across the funnel above the opening, the said partition fitting the inside of the funnel except at a point above and in line with the screen where it is removed to form a discharge opening over the screen, a positioning and locking device for the partition, and means whereby the partition may be rotated.

2. In a strainer device, a funnel and removable parallel horizontal partitions for said funnel, and means to hold said partitions in spaced relation and non-rotative with respect to one another.

3. In a strainer device, a funnel and removable parallel horizontal partitions dividing the funnel into three chambers, the central one of which is a filtering chamber, and means to hold said partitions in spaced relation to each other and to form a device whereby they may be rotated together.

4. In a strainer device, a funnel having openings in the inclined wall thereof, screens over the openings, partitions above and below the said screens, and means to hold said partitions in spaced apart relationship so that they may be removed as a single piece.

5. In a strainer, a funnel having openings in the inclined wall thereof spaced from the bottom, screens over the openings, and a removable one-piece device having upper and lower disks fitting within the funnel to form three chambers therein.

6. In a strainer, a funnel having openings in the inclined wall thereof spaced from the bottom, screens over the openings, and a removable one-piece device having upper and lower disks adapted to fit within the funnel above and below the openings and form three chambers therein, a portion of said disks being removed to form openings in line with the openings in the wall of the funnel.

EDWARD G. VON GUNTEN.